US008108438B2

(12) United States Patent
Hadani

(10) Patent No.: US 8,108,438 B2
(45) Date of Patent: Jan. 31, 2012

(54) FINITE HARMONIC OSCILLATOR

(75) Inventor: Ron Hadani, Rehovot (IL)

(73) Assignees: Nir Asher Sochen, Tel Aviv (IL); Shamgar Gurevich, Tel Aviv (IL); Ron Hadani, Rehovot (IL)

( * ) Notice: Subject to any disclaimer, the term of this patent is extended or adjusted under 35 U.S.C. 154(b) by 945 days.

(21) Appl. No.: 12/028,843

(22) Filed: Feb. 11, 2008

(65) Prior Publication Data

US 2009/0204627 A1    Aug. 13, 2009

(51) Int. Cl.
 *G06F 7/00* (2006.01)
(52) U.S. Cl. ........................... 707/802; 370/320
(58) Field of Classification Search .............. 707/802; 370/320
 See application file for complete search history.

(56) References Cited

U.S. PATENT DOCUMENTS

| 5,583,963 | A  | * | 12/1996 | Lozach ................. | 704/219 |
| 5,602,938 | A  | * | 2/1997 | Akiyama et al. ......... | 382/155 |
| 5,831,934 | A  |   | 11/1998 | Gill et al. | |
| 6,278,686 | B1 |   | 8/2001 | Alard | |
| 6,466,685 | B1 | * | 10/2002 | Fukui et al. ............ | 382/115 |
| 7,271,747 | B2 |   | 9/2007 | Baraniuk et al. | |
| 7,272,599 | B1 |   | 9/2007 | Gilbert et al. | |
| 7,539,273 | B2 | * | 5/2009 | Struckman ............. | 375/341 |
| 2002/0152390 | A1 | * | 10/2002 | Furuyama et al. ........ | 713/185 |
| 2003/0025633 | A1 | * | 2/2003 | Cai et al. .............. | 342/378 |

OTHER PUBLICATIONS

"Weil Representation, Deligne Sheaf and Proof of the Kurlberg-Rudnick Conjecture" Thesis submitted for the degree "Doctor of Philosophy" University of Tel-Aviv.

Tropp, J. A.,"Just Relax: Convex Programming Methods for Identifying Sparse Signals in Noise" *IEEE Transactions on Information Theory*, vol. 52, No. 3, pp. 1030-1051. Mar. 2006.
Howard, S. D.; Calderbank, A. R.; Moran, W. "The finite Heisenberg-Weyl groups in Radar and Communications" *EURASIP Journal on Applied Signal Processing* Art. No. 85685 2006.
Paterson K.G. and Tarokh V., "On the Existence and Construction of Good Codes with Low Peak-to Average Power Rations". *IEEE Trans. Inform. Theory 46*, 2000.
Howe R., "Nice error bases, mutually unbiased, induced representationas, the Heisenberg group and finite geometries". *Indag. Math* (N.S) 16: No. 3-4. 553/583 (2005).
T.W. Parks, and R.G. Shenoy, "Discrete-Time, Discrete-Frequqncy, Time-Freunecy Analysis" *IEEE Transactions on Signal Processing*, vol. 46, No. 6 pp. 1517-1527, 1998.
B. Torrsani. "*Two signal processing problems involving coherent states methods*", Rep. Math. Phys. vol. 43 pp. 341-356, 1999; pp. 1-14.
Howard et al, "*Finite heisenberg-weyl groups and golay complementary sequences*" in Proc. Of the 2$^{nd}$ international Waveform Diversity and Design Conf. Jan. 2006, Kauai, HI, pp. 1-8.

* cited by examiner

*Primary Examiner* — Cheyne Ly
(74) *Attorney, Agent, or Firm* — Mark Friedman

(57) ABSTRACT

A dictionary at least partially spans a set of discrete q-length signals. The atoms of the dictionary are eigenvectors of a representation of a commutative subgroup of a finite symplectic group. The dictionary may be used for interpreting a radar signal, denoising a signal, compressing data, finding a sparse representation, deblurring at a signal finding a sparse representation of a signal, encoding a signal for communication, encoding a symbol for CDMF communication, classifying a data set and generating a random number.

6 Claims, 8 Drawing Sheets

FINITE HARMONIC OSCILLATOR

RELATED APPLICATION DATA

This patent application claims the benefit of PCT Patent Application No. PCT/IL2008/000046, International filing date Jan. 10, 2008 which claims priority from U.S. Provisional Patent Application No. 60/884,222, filed Jan. 10, 2007.

FIELD AND BACKGROUND OF THE INVENTION

Various methods and systems to generate a dictionary for coding and decoding signals are possible, and particularly, methods and systems may produce a large dictionary of atoms having the desirable properties of weak mutual coherence, weak autocorrelation and a small supremum (the supremum is sometimes referred to as the peak-to-average power ratio).

Digital signals, or simply signals, can be thought of as functions of a finite number of elements. The elements may be spaced along a line (single-dimensional), along a plane (two-dimensional) in space (three-dimensional) or in a hyperspace (multi dimensional). For example, in one-dimension we will consider $F_q$ the finite line namely the finite field with q elements indexed by time t. The space of signals $H=C(F_q)$ is a Hilbert space equipped with a natural Hermitian product $$\langle \phi, \varphi \rangle = \sum_{i \in F_q} \phi(t) \overline{\varphi(t)}$$

for two signals $\phi$, $\phi \in H$.

A central problem is constructing useful classes of signals that demonstrate strong descriptive power and at the same time are characterized by formal mathematical conditions. Meeting these two requirements is a non-trivial task and is a source for many novel developments in the field of signal processing. The problem was tackled, over the years, by various approaches. In the classical approach, a signal is characterized in terms of its expansion with respect to a specific basis. A standard example of this kind is the class of limited band signals, which is defined using the Fourier basis and consists of signals with a specified support of their Fourier representation.

However, for certain applications this approach is too restrictive. In a more general approach, the signal is characterized in terms of its expansion with respect to a frame, which is kind of a generalized basis. The theory of wavelets is a particular application of this approach (see U.S. Pat. No. 7,272,599 issued to Gilbert, et al.). As it turns out, many classical results from linear algebra have appropriate generalizations to the setting of frames, as a consequence, wavelets analysis exhibit structural similarity to Fourier analysis.

Recently, (e.g. U.S. Pat. No. 7,271,747 issued to Baraniuk, et al.) a novel approach was introduced, hinting towards a fundamental change of perspective about the nature of signals. This new approach uses the notion of a dictionary, which is yet another kind of generalized basis. The basic idea is the same as before, namely, a signal is characterized in terms of its expansion as a linear combination of vectors in the dictionary. Each vector in the dictionary is called an atom. The main difference is that the characterization is intrinsically non-linear, hence as a consequence, one comes to deal with classes of signals which are not closed with respect to addition. More formally a dictionary is a set D of atoms $S_i$ (in some of the literature listed herein [e.g. Gurevich, S., "Weil Representation, Deligne Sheaf and Proof of the Kurtberg-Rudnick Conjecture", Thesis submitted for the degree "Doctor of Philosophy" University of Tel-Aviv, available at arXiv:math-ph/0601031 v1 15 Jan. 2006] the dictionary D is referred to as a system S and the atoms are referred to as signals) for the sake of discussion herein the symbols D and D are the same and the symbols $F_q$ and $F_q$ are the same.

A very simple example of a dictionary 110 is illustrated in FIG. 1. Dictionary 110 may be thought of as a matrix having L columns each column being an atom $S_i$ 115*a-v*, which is a q-length vector. In the example of FIG. 1, q=11 and L=22. A signal 120 (which can be thought of as a q-length vector) is the product of dictionary 110 and a vector of coefficients 130. The rank of dictionary 110 and the length of vector 120 are q. Necessarily, q≦L. The atoms are normalized i.e. $kS_ik_2=1$. It is clear that if q<L a single signal may be represented in more than one way and thus coefficients $a_1 \ldots a_L$ are not unique. One idea is to find the sparsest possible representation of $$\psi = \sum_{S \in D} a_s S$$

(sparse meaning having few non-zero coefficients).

In the example of FIG. 1 atoms 115*a-k* ($S^s_0$ through $S^s_{10}$) are the standard basis of $F_{11}$ i.e. $S^s_j=\delta(t-\tau_j)$ for $\tau_j 2F_{11}$ i.e. j=(0, 1, 2, 3 ... 10). Atoms 115*l-v* ($S^f_0$ through $S^f_{10}$) are the Fourier basis $S^f_j=q^{-1/2}\exp(i2\pi\omega_j t/q)$ where i is the square root of −1 and $\omega_j$, $t_j 2F_q$ and as stated before in the example of FIG. 1, q=11. Clear each basis $S^s_i$ (atoms 115*a-k*) and $S^f_j$ (atoms 115*l-v*) span $F_{11}$. Therefore the coefficient vector $(a_1, \ldots, a_{22})$ is not unique: We can express a vector $\psi$ in many ways. For example in FIG. 2*a* a signal 220*a* $\psi=\alpha_1\delta(t-4)+\alpha_1 q^{-1/2}\cos(2\pi 3t/q)$ is illustrated in terms of the standard basis (thus each asterisk in the FIG. 2*a,b* represents the value of the coefficient $a_i$ for i={0, 1, 2, 3, ..., 10} given by the x-axis and $a_j$=0 for j={11, 12, 13 ... 21}. Alternatively, in FIG. 2*b* we can express the signal 220*b* $\psi$ in the Fourier basis. The Fourier transform of $\psi$ is $\hat{\psi}(f)=\alpha_1 q^{-1/2}\cos(2\pi\tau f/q)+\alpha_2\delta(f-\omega)$, thus the to express $\psi$ in the Fourier basis we set $a_0, \ldots, a_{10}$=0 and set $a_{11}, \ldots, a_{21}$ the numbers shown by the asterisk in FIG. 2*b*. In either case (the coefficients of the standard basis in FIG. 2*a* or of the Fourier basis FIG. 2*b*) representing signal 220*a,b* $\psi$ requires 11 non-zero coefficients. On the other hand using our entire dictionary 110 we find that $\psi=\alpha_1 S^s_5+\alpha_2 S^f_4$ and thus can be represented by the coefficient vector $\{0,0,0,0,0,\alpha_1,0,0,0,0,0,0,0,0,0,\alpha_2,0,0,0,0,0,0\}$. Finding this sparse representation has great value in signal analysis (for example in Code Division Multiple Access CDMA if two transmitters are transmitting simultaneously, the coefficients of the sparse representation are the clean signals of each of the transmitters; similarly in data compression, the sparse representation is the most efficient way to store the data). The obvious goal then is to find the largest possible dictionary from which we can find a unique sparse representation of a large class of signals.

The first question that needs to be addressed is, given a representation of a signal, whether it is the sparsest representation or is there an alternative sparse or sparser representation. The mathematical tools to answer this question are as follows. The dictionary D is called an N-independent set if every subset D' ⊂ D, with N elements jD'j=N, is linearly independent. Given a 2N-independent set D, every signal $\psi 2H$, has at most one representation of the form $$\psi = \sum_{S \in D'} a_s S.$$

$D' \subset D$, with $|D'| \leq N$. Such a representation, if exists, is unique and is called the sparse representation. Consequently another name for such a set D is an N-sparse dictionary. Given that a signal $\psi$ admits a sparse representation, it is natural to ask whether the coefficients $a_s$ can be effectively reconstructed. A dictionary D for which there exists a polynomial time algorithm for reconstructing the "sparse" coefficients is called an effectively N-sparse dictionary. As an example in CDMA if one has an effectively N-sparse dictionary with $q^3$ atoms, one can assign a separate code to $q^3$ users and at any given time and place as many as N users may simultaneously transmit without significant interference.

To give some feeling for the new concept, we note that an orthonormal basis appears as a degenerate example of an effectively sparse dictionary. More precisely, it is dimH-sparse, consisting of dimH atoms. The effectiveness follows from the fact that the coefficient $a_s$ can be reconstructed from a signal $\psi$ by $a_s = \langle S, \psi \rangle$.

A basic problem in the new theory is introducing systematic constructions of "good" effectively N-sparse dictionaries. Here "good" means that the size of the dictionary and the sparsity factor N are made as large as possible. Currently, the only known methods use either certain amount of randomness or are based on ad-hoc considerations.

Showing that a dictionary is effectively N-sparse is difficult. A way to overcome this difficulty is to introduce the stronger notion of weakly correlated dictionaries. A dictionary D is called "$\mu$-correlated for $0 \leq \mu \ll 1$ if for every two different atoms $S_i \neq S_j \in D$ we have $|\langle S_i, S_j \rangle| \leq \mu$. The two notions of correlation and sparsity are related by the following proposition: If D is 1/R-correlated then D is effectively R/2-sparse.

The final question is whether it is possible to find the sparse representation. The tools to answer this question are also available in mathematics. In general if there exists a representation of a signal $$\psi = \sum_{i=1}^{N} a_i S_i$$

such that $N < (2^{-1/2} - 0.5)/\mu$ where $\mu$ is the maximum cross-covariance $\mu = \max_{i,j} |\langle S_i, S_j \rangle|$, then the representation is unique and can be found using known minimization and optimization routines that are commercially available for example in MATLAB® matrix operation package and particularly using the signals and optimization toolboxes (more details on this are available in the manual to MATLAB® and in the literature for example see Tropp, J. A., Just Relax: Convex Programming Methods for Identifying Sparse Signals in Noise, IEEE TRANSACTIONS ON INFORMATION THEORY, VOL. 52, NO. 3, pp 1030-1051, MARCH 2006)

Thus, given a dictionary D, there are various desired properties which appear in the engineering wish list [e.g. see Howard, S. D.; Calderbank, A. R.; Moran, W. "The finite Heisenberg-Weyl groups in radar and communications". EURASIP JOURNAL ON APPLIED SIGNAL PROCESSING Art. No. 85685 2006 (2006); Golomb S. W. and Gong G., *Signal design for good correlation. For wireless communication, cryptography, and radar*. Cambridge University Press, Cambridge (2005); W. Miller, "Topics in harmonic analysis with applications to radar and sonar," in *Radar and Sonar, Part I*, R. Blahut, W. Miller, and C. Wilcox, Eds., IMA Volumes in Mathematics and Its Applications, Springer, New York, N.Y., USA, 1991; L. Auslander and R. Tolimieri, "Radar ambiguity functions and group theory," *SIAM Journal on Mathematical Analysis*, vol. 16, no. 3, pp. 577-601, 1985; M. S. Richman, T. W. Parks, and K. G. Shenoy, "Discrete-time, discrete-frequency, time-frequency analysis," *IEEE Transactions on Signal Processing*, vol. 46, no. 6, pp. 1517-1527, 1998.]. For example, in various situations one requires that the atoms will be weakly cross-correlated, i.e., that for any two atoms $S_i, S_j \in D |\langle S_i, S_j \rangle| \ll 1$; this property is trivially satisfied if D is an orthonormal basis. Such a system cannot consist more then dimH atoms, however, for certain applications, [e.g., CDMA as explained by Viterbi A. J., CDMA: *Principles of Spread Spectrum Communication*. Addison-Wesley Wireless Communications (1995).] a larger number of atoms is desired, in that case the orthogonality condition is relaxed.

During the transmission process, an atom S might be distorted in various ways. Two basic types of distortions are time shift $S(t) \mapsto L_\tau S(t) = S(t+\tau)$ and phase shift $S(t) \mapsto M_\omega S(t) = \exp(2\pi i \omega t/q) S(t)$, where $\tau, \omega \in F_q$. The first type appears in asynchronous communication and the second type is a Doppler effect due to relative velocity between the transmitting and receiving antennas. In conclusion, a general distortion is of the type $S \mapsto M_\omega L_\tau S$; suggesting that for every $S_i, S_j \in D$ it is natural to require the following stronger condition that both the autocorrelation and the cross correlation for all atoms under a general distortion be small $|\langle S_i, M_\omega L_\tau S_j \rangle| \ll 1$ for all $\omega, \tau \in F_q$ and for all $S_i, S_j \in D$ (that is to say whether i=j or i≠j); Also in radar from the time translation of a reflected signal it is possible to identify the distance to the target and from the frequency modulation of the reflected signal it is possible to determine the speed at which the target is approaching/being approached. Thus in radar it is desirable to have a system that is sensitive to these distortions so that by optimization one can determine the distortion and thus location and velocity of the target.

Due to technical restrictions in the transmission process, signals are sometimes required to admit low peak-to-average power ratio [for an explanation of this requirement see Paterson, K. G. and Tarokh V., "On the existence and construction of good codes with low peak-to-average power ratios". *IEEE Trans. Inform. Theory* 46 (2000).], i.e., low peak-to-average power ratios means that for every normalized $S \in D \max_t |S(t)| : t \in 2F_p| \ll 1$ (normalized means that $\|S\| = 1$):

Finally, several schemes for digital communication require Fourier invariance, which means that the above properties will continue to hold also if we replace atoms from D by their Fourier transform:

To find a dictionary that spans a signal space and has the desired properties, it is necessary to use a few results from representation theory. A group is a set of elements and a multiplication rule such that the set is closed under multiplication, a neutral element with respect to the multiplication belongs to this set and that for each element its inverse belongs to the set. An example is the set of unitary operators on the Filbert space of functions over the finite field $F_q$ where q is a power of a prime number {a unitary operator acts on a member of the Hilbert space and assigns it to another member of the Hilbert space}. We denote the Hilbert space by $H(F_q)$, and the group of unitary operators on that Hilbert space by $U(H(F_q))$. The multiplication is the composition. In a given coordinate system these operators are $q \times q$ matrices and the multiplication is the usual matrix multiplication. An Abelian group is a commutative group $g_1 g_2 = g_2 g_1$. An Abelian subgroup of $U(H(F_q))$ can be diagonalized together by a single set of eigenvectors $S_i$. These eigenvectors span the Hilbert space.

An example of an Abelian group is the set of time shifts $L(\tau_i)$ [$L(\tau_i)$ is the same as $L_\tau$ above] for all $\tau_i \in F_q$ where $L(\tau_i)S_i(t)=S_i(t+\tau_i)$. It is clear that time shifting is commutative $\{L(\tau_1)L(\tau_2)S_i(t)=L(\tau_2)L(\tau_1)S_i(t)\}$. The Abelian group of time shifts may be written as a q£q matrix where the (j,k) matrix element is $(L(\tau_i))_{jk}=\delta(\tau_j-\tau_k+\tau_i)$ where $\delta(x)=1$ if $x=0$ mod q and 0 otherwise. The eigenvectors of this matrix are the vectors $S^f_i=q^{-1/2}\exp(i2\pi\omega_i t/q)$ that we defined previously because $L(\tau)S^f_j(t)=\lambda_j(\tau)S^f_j(t)$ where $\lambda_j(\tau)=q^{-1/2}\exp(i2\pi\omega_j\tau/q)$. Similarly the group of frequency modulations $M(\omega)S_i(t)=\exp(2\pi i\omega t/q)S_i(t)$ has as its eigenvectors the vectors $S^S_j=\delta(t-\tau_j)$ because $M(\omega)S_i(t)=\lambda_j(\omega)S^f_j(t)$ where $\lambda_j(\omega)=q^{-1/2}\exp(i2\pi\omega\tau_j/q)$ [the terminology $M(\omega)$ and $M_\omega$ refer to the same frequency shift].

Continuous Heisenberg-Weyl groups have long been applied to interpret radar signals [e.g. see U.S. Pat. No. 5,831, 934 issued to Gill et al.; W. Miller, "Topics in harmonic analysis with applications to radar and sonar," in *Radar and Sonar, Part I*, R. Blahut, W. Miller, and C. Wilcox, Eds., IMA Volumes in Mathematics and its Applications, Springer, New York, N.Y., USA, 1991; L. Auslander and R. Tolimieri, "Radar ambiguity functions and group theory," *SIAM Journal on Mathematical Analysis*, vol. 16, no. 3, pp. 577-601, 1985]. More recently it has been suggested that finite Heisenberg-Weyl groups could be useful building a dictionary for digital radar and communication [Howe R., "Nice error bases, mutually unbiased bases, induced representations, the Heisenberg group and finite geometries". *Indag. Math*. (N.S.) 16: no. 3-4, 553.583 (2005); Howard, S. D.; Calderbank, A. R.; Moran, W. "The finite Heisenberg-Weyl groups in radar and communications". EURASIP JOURNAL ON APPLIED SIGNAL PROCESSING Art. No. 85685 2006 (2006).]

The Heisenberg dictionary $D_H$ is constructed using the representation theory of the finite Heisenberg group. For a digital signal having q elements the Heisenberg dictionary contains of the order of $q^2$ atoms and is $q^{-1/2}$ correlated.

To form the Heisenberg dictionary rather than taking separately frequency modulations and time translations (making a dictionary having 2q atoms as in the example of FIGS. 1, 2a and 2b), the translation and modulations are conjugated. This conjugation produces 2D q×q array of combinations of time translations and frequency modulations. It is not trivial to make a homomorphism from the time frequency plane $F_q \times F_q$ that consists of $q^2$ couples $(\tau,\omega)$ to unitary operators on a the corresponding Hilbert space of q-dimensional signals. There is nevertheless a well known homomorphism $\Pi(\tau,\omega,z)=\exp[(\pi i\tau\omega+2z)/q]M_\omega L_\tau$ with the group law $(\tau_1,\omega_1,z_1)\cdot(\tau_2,\omega_2,z_2)=(\tau_1\tau_2, \omega_1+\omega_2, z_1+z_2+(\tau_1\omega_2-\tau_2\omega_1)/2)$. As stated above, a set of unitary operators can be found spanning an Abelian group (a set with a commutative multiplication law). The Heisenberg group law is not commutative because $(\tau_1\omega_2-\tau_2\omega_1)\neq(\tau_2\omega_1-\tau_1\omega_2)$. Nevertheless, for a subgroup of the $F_q \times F_q$ plane where $\tau_2\omega_1-\tau_1\omega_2=0$ the law is commutative. Furthermore, for a given $\tau_2,\omega_2$ then the law is commutative along the line $\omega_1=\tau_1\omega_2/\tau_2$ through the origin. More generally, any line through the origin is a commutative subspace in the Heisenberg representation. Therefore, we can choose a set of (q+1) lines through the origin and on each of those lines choose a set of q eigenvectors and the total set of all q(q+1) eigenvectors forms a Heisenberg dictionary that spans the entire Hilbert space of signals.

As it turns out, the Heisenberg dictionary has the following properties: The dictionary has q(q+1) signals. The autocorrelation is 1 for modulation/translation that is a characteristic function of a line passing through the origin (an Abelian subgroup of the Heisenburg representation) 0 otherwise. The cross correlation is 1 for two signals on a line passing through the origin and zero otherwise. The supremum is $q^{-1/2}$. Thus it is possible to identify the line through the origin in the time/frequency plane to which the signal belongs. This is useful but not optimal in radar because it is difficult to determine the location and the velocity of a target independently. Similarly in communication this leads to interference between some signals of the system. The ambiguity function is a measure of signal interference (or specificity of identification for radar). Thus the ambiguity function of the Heisenberg system (illustrated in FIG. 3) instead of sharp peak has a linear ridge along a line crossing the origin. It is preferable to have a symmetric peak, thus for example U.S. Pat. No. 6,278,686 issued to Alard reveals a method to reshape an ambiguity function to achieve symmetry.

There is thus a widely recognized need for, and it would be highly advantageous to have a large dictionary of atoms having the desirable properties of a small normalized peak-to-average power ratio, weak cross correlation (both of pure atoms and of atoms that have undergone time translation or frequency modulation), and weak autocorrelation under time translation or frequency modulation.

SUMMARY OF THE INVENTION

Various methods and systems to produce a dictionary of atoms are possible, and particularly, methods and systems may employ a Weil representation of a commutative subgroup of a finite symplectic groups and atoms of the dictionary may be the eigenvectors of the Weil representation.

An embodiment of a dictionary at least partially spanning a set of discrete q-length signals may include a representation of a commutative subgroup of a finite symplectic group, and may also include a plurality of atoms wherein each of the atoms is an eigenvector of the representation.

In the dictionary the symplectic group may be a n-dimensional matrix $Sp(n,F_q)$.

In the dictionary there may be at least q(q+1)+1 atoms.

In the dictionary the atoms may have one of the verifiable properties of a normalized peak-to-average power ratio of less the inverse of the square root of q ($PMPR \leq q^{-1/2}$), an autocorrelation under frequency modulation of less than 2 $q^{-1/2}(q+1)/(q-1)$ ($|\langle\phi,M_\omega\phi\rangle|\leq 2(q+1)(q-1)^{-1}q^{-1/2} \forall \phi\in D_0, \omega\neq 0$), an autocorrelation under time translation of less than $2q^{-1/2}(q+1)(q-1)^{-1}$ ($|\langle\phi,L_\tau\phi\rangle|\leq 2(q+1)(q-1)^{-1}q^{-1/2} \forall \phi\in D_0, \tau\neq 0$) or a cross correlation of less than $4q^{-1/2}(q+1)(q-1)^{-1}$ ($|\langle\phi,L_\tau M_\omega\phi\rangle|\leq 4q^{-1/2} \forall \tau,\omega\in F_q$ and $\phi, \phi\in D_0$). At least one of these properties may be invariant under one of the following operations a Fourier transform, a quadratic modulation or a homothety.

A dictionary may also include a minimization procedure for extracting a sparse representation of at least one of the signals in terms of at least one atom from the plurality of atoms.

In the dictionary the symplectic representation may be a Weil representation.

The dictionary may be applied to one of the following tasks interpreting a radar signal, denoising at least one of the signals, compressing data, finding a sparse representation, deblurring at least one of the signals, finding a sparse representation of one of the signals, encoding a symbol for communication, encoding at least one symbol for CDMA or OFDM communication, classifying a data set and generating a random number.

An embodiment of a method of producing a dictionary at least partially spanning a set of discrete q-length signals may include the following steps: defining a representation of a commutative subgroup of a finite symplectic group, and specifying a plurality of atoms wherein each of the plurality of atoms is an eigenvector of the representation.

In the method of producing a dictionary, the symplectic group may be $Sp(2n,F_q)$.

In the method of producing a dictionary, there may be least $q(q+1)+1$ atoms.

In the method of producing a dictionary, the verifiable properties of the atoms may include a normalized peak-to-average power ratio of less the inverse of the square root of q (PMPR$\leq q^{-1/2}$), an autocorrelation under frequency modulation of less than $2q^{-1/2}(q+1)/(q-1)$ ($|\langle\phi,M_\omega\phi\rangle|\leq 2(q+1)^{-1}q^{-1/2} \forall\phi\in G_0, \omega\neq 0$), an autocorrelation under time translation of less than $2(q+1)(q-1)^{-1}q^{-1/2}(|\langle\phi,L_\tau\phi\rangle|\leq 2(q+1)(q-1)^{-1}q^{-1/2} \forall\phi\in G_0, \tau\neq 0$) or a cross correlation of less than $4(q+1)(q-1)^{-1}q^{-1/2}(|\langle\phi,L_\tau M_\omega\phi\rangle|\leq 4q^{-1/2} \forall\tau, \omega\in F_q$ and $\phi\in G_0)$. One or more of the above properties may be invariant under one or more of the operations of a Fourier transform, a quadratic modulation and a homothety.

The method of producing a dictionary may also include the step of extracting a sparse representation of at least one of the signals in terms of at least one of the atoms.

In the method of producing a dictionary, the representing may be via a Weil representation.

The method of producing a dictionary may further include the step of applying the dictionary to one of the following tasks interpreting a radar signal, denoising at least one of the signals, compressing data, finding a sparse representation, deblurring at least one of the signals, finding a sparse representation of at least one of the signals, encoding a symbol for communication, encoding at least one symbol for CDMA or OFDM communication, classifying a data set and generating a random number.

An embodiment of a method to interpret a radar signal may include the steps of providing a plurality of atoms which at least partially span a set of signals and determining a time shift of an echo of at least one of the signals. Each of the atoms may be an eigenvector of a representation of a commutative subgroup of a finite symplectic group.

The method to interpret a radar signal may also include: resolving a frequency modulation of the echo.

An embodiment of a method to acquire a sparse representation of a signal may include the steps of providing a plurality of atoms and determining a sparse representation of the signal in terms of the atoms. The atoms may at least partially span the signal and each of the atoms may be an eigenvector of a representation of a commutative subgroup of a finite symplectic group.

An embodiment of a method of communication using a set of signals may include the steps of providing a plurality of atoms and encoding at least one of the signals using at least one of the atoms. The atoms may at least partially span the signals and each of the atoms may be an eigenvector of a representation of a commutative subgroup of a finite symplectic group.

BRIEF DESCRIPTION OF THE DRAWINGS

Various embodiments of a system and method to generate a dictionary for coding and decoding signals are possible, and are herein described, by way of example only, with reference to the accompanying drawings, where.

DESCRIPTION OF THE PREFERRED EMBODIMENTS

The principles and operation of a system and method to generate a dictionary for coding and decoding signals, and particularly, a method and system for producing a large dictionary of atoms having the desirable properties of weak mutual coherence, cross-correlation, weak autocorrelation and a small supremum according to various embodiments may be better understood with reference to the drawings and the accompanying description.

Figure 1:
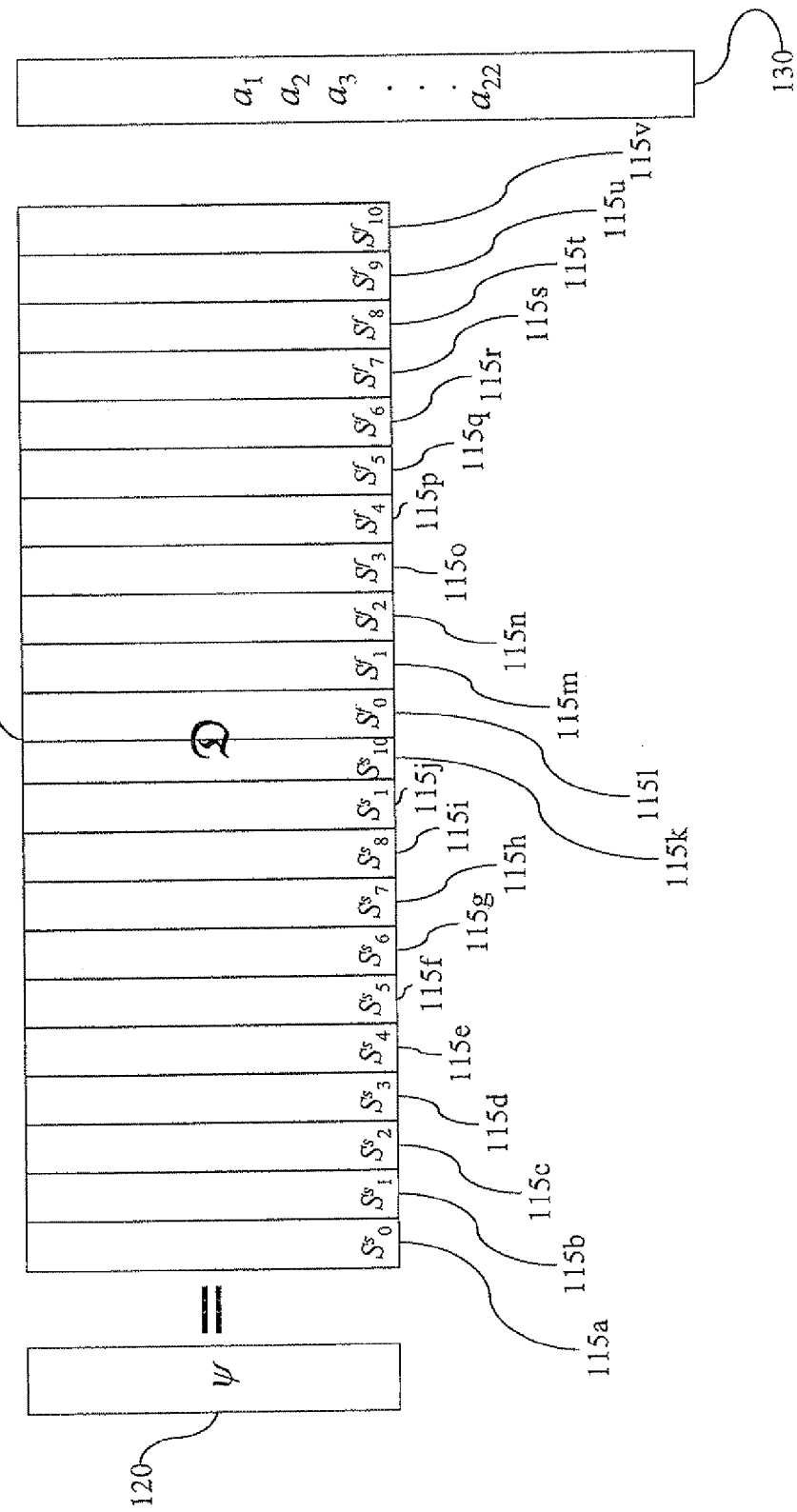
FIG. 1 is an illustration of a previous art dictionary.
Figure 2A:
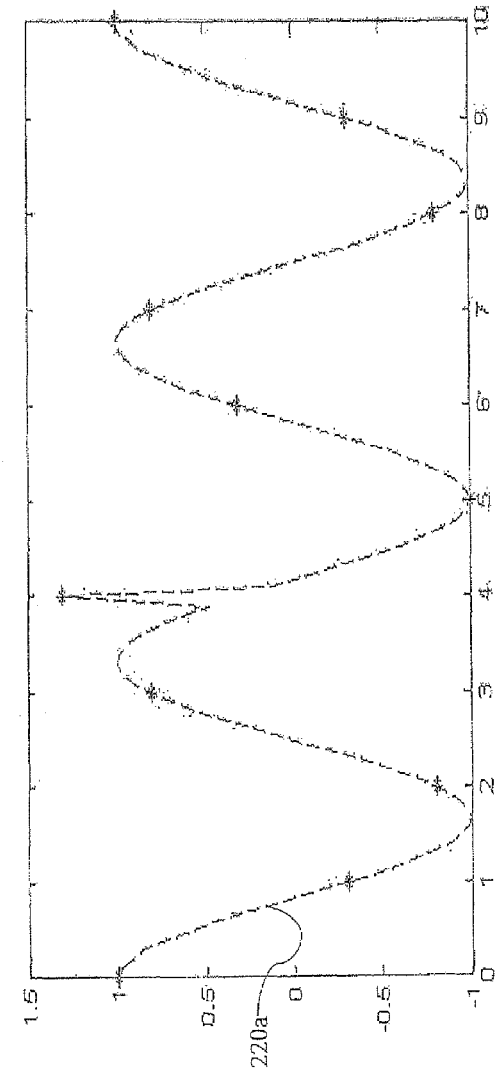
FIG. 2 is an illustration of two alternative non-sparse representations of a signal in terms of the dictionary illustrated in FIG. 1.
Figure 2B:
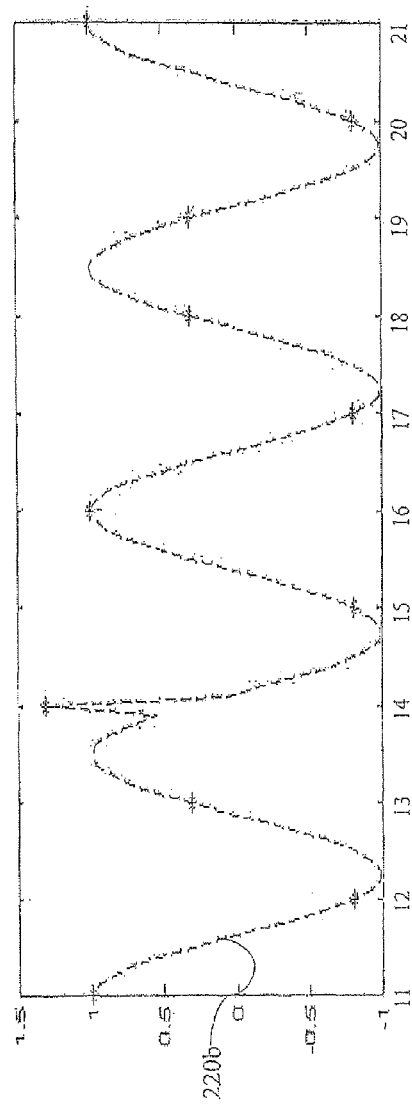
Figure 3:
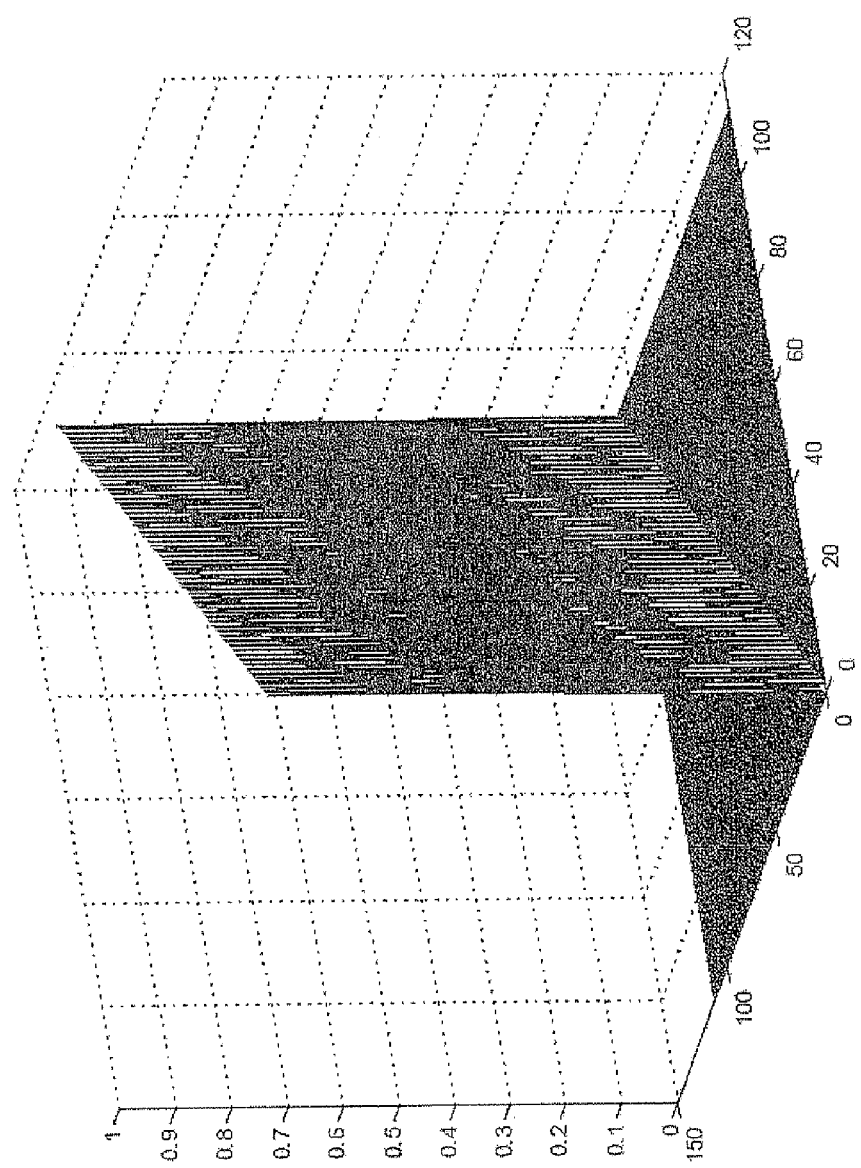
FIG. 3 is a graph of an ambiguity function for a Heisenberg dictionary.
Figure 4:
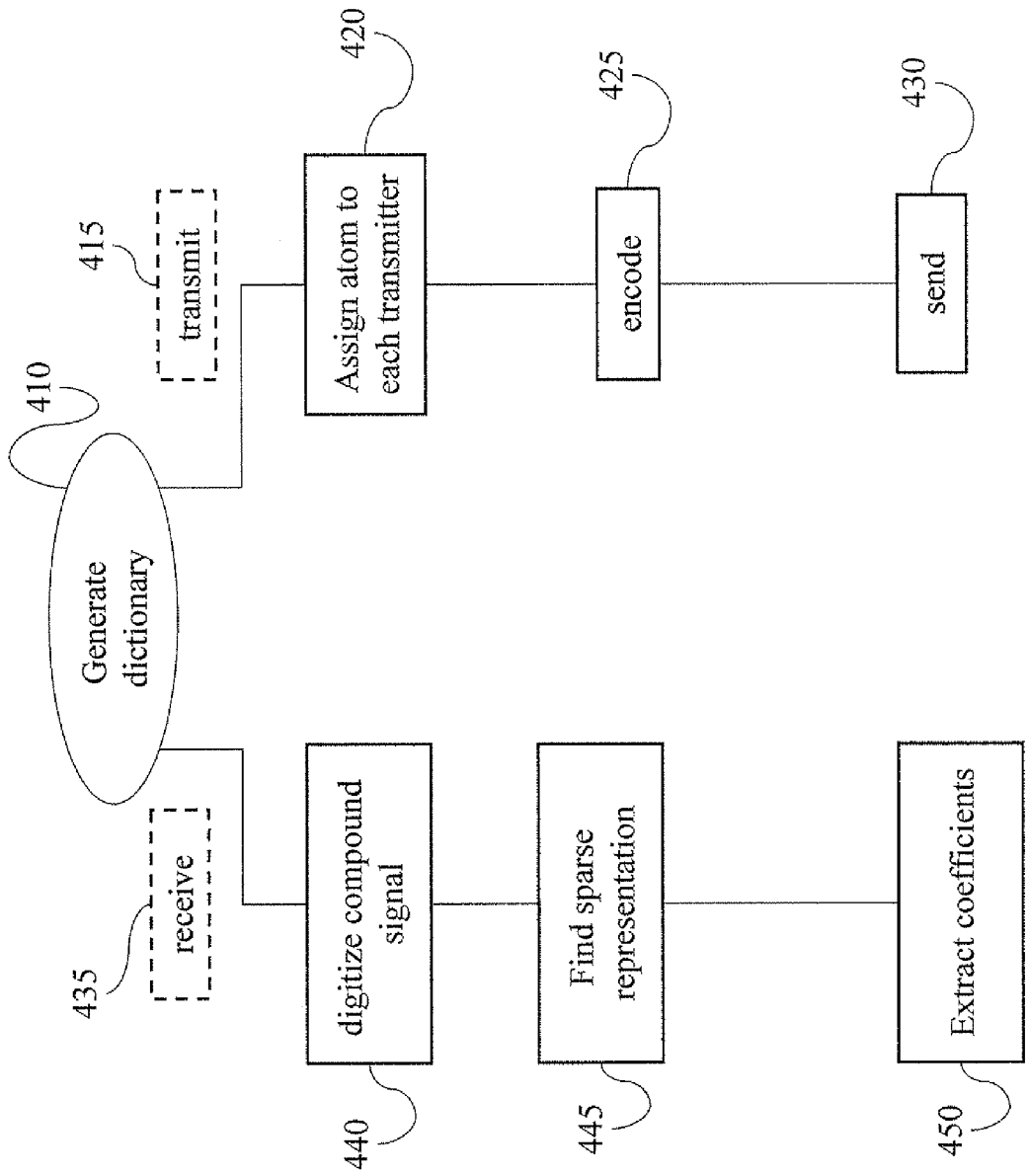
FIG. 4 is a flowchart of a method of CDMA communication using a Weil dictionary.

Attention is called to FIG. 4, which is a flow chart illustrating use of the Heisenberg-Weil dictionary for CDMA communication (Note that some authors label the Heisenberg group described in the background section as a Heisenberg-Weyl groups. This is not the same as the Heisenberg-Weil dictionary described herein below). The first step is to generate a large Weil dictionary 410 (as will be described below in detail in the description of FIG. 8). Then for transmitting 415 a atom is assigned 420 to each transmitter. Intuitively the atom can be thought of as a value at each of q-time steps. The transmitter then encodes 425 a message by modulation onto the atom (for example for amplitude modulation a vector is created by multiplying the value of the atom at each time by the value of the message) [similar to the example in the embodiment of FIG. 1, where the message of a first transmitter is $\alpha_1$ and the message of a second transmitter is $\alpha_2$ and the first transmitter encodes the message $\alpha_1$ onto the atom $\delta(4)$ giving a signal which is a vector $\phi$ having values $\phi_i=\alpha_1\delta(4-i)$ and the second transmitter encodes the message $\alpha_2$ onto another atom $q^{-1/2}\cos(2\pi 3t/q)$ giving a second vector $\phi$ where $\phi_j=\alpha_2 q^{-1/2}\cos(2\pi 3j/q)$]. Then the resulting signal is sent 430 (for example by amplitude modulation where the digital code is made into an analogue radio wave having an amplitude corresponding to value of the encoded signal at the times corresponding to each element of the vector).

Receiving 435 the resulting a radio signal includes the steps of first generating the set of atoms. Then the composite radio wave resulting from the addition of the signals of the first and second transmitters is digitized 440 (in the case of amplitude modulation a vector of numbers are assigned each number corresponding to an amplitude of the received wave at a time). Then minimization is used to find 445 a sparse representation in terms of the atoms of the dictionary. By the theorems above, if the dictionary is N-sparse for N>2 then it is clear that the sparsest representation will have zero for all of the atoms and $\alpha_1$ for the atom assigned to the first transmitter and $\alpha_2$ for the atom assigned to the second transmitter. The two messages corresponding to the coefficients $\alpha_1$ and $\alpha_2$ are then extracted 450.

Figure 5:
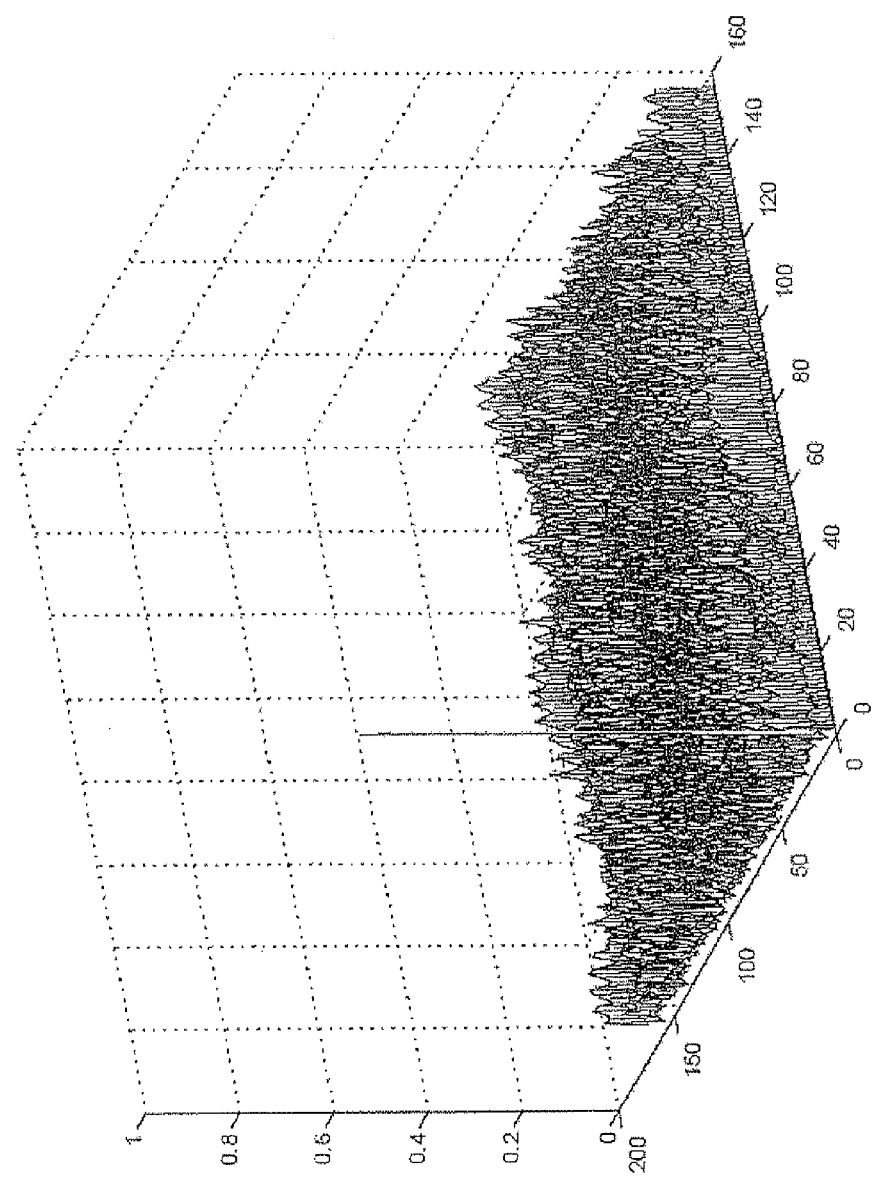
FIG. 5 is a graph of an ambiguity function for a CDMA pseudo noise dictionary.

Prior art CDMA used atoms that are pseudo-random codes. The orthagonality of these codes is not guaranteed, but if the length of the code is much longer than the number of transmitters, it is very unlikely that there will be a large cross correlation between codes. Thus when finding the value transmitted by a particular transmitter, the signals of others transmitters will interfere in a random way (some interfering more some less). Thus, the specificity of reception can be described by an ambiguity function. An example of an ambiguity function for CDMA using pseudo random codes is show in FIG. 5. In CDMA the ambiguity function can be interpreted as the strength of reception a signal (shown at the origin) filtered by the received for a particular atom in a background of noise that are signals transmitted by modulating onto other atoms (illustrated as peaks not at the origin). It is seen that some the interfering peaks of the signals of other atoms are large while other interfering peaks are small. The largest interfering peak limits the reception of the signal on a noisy channel.

Figure 6:
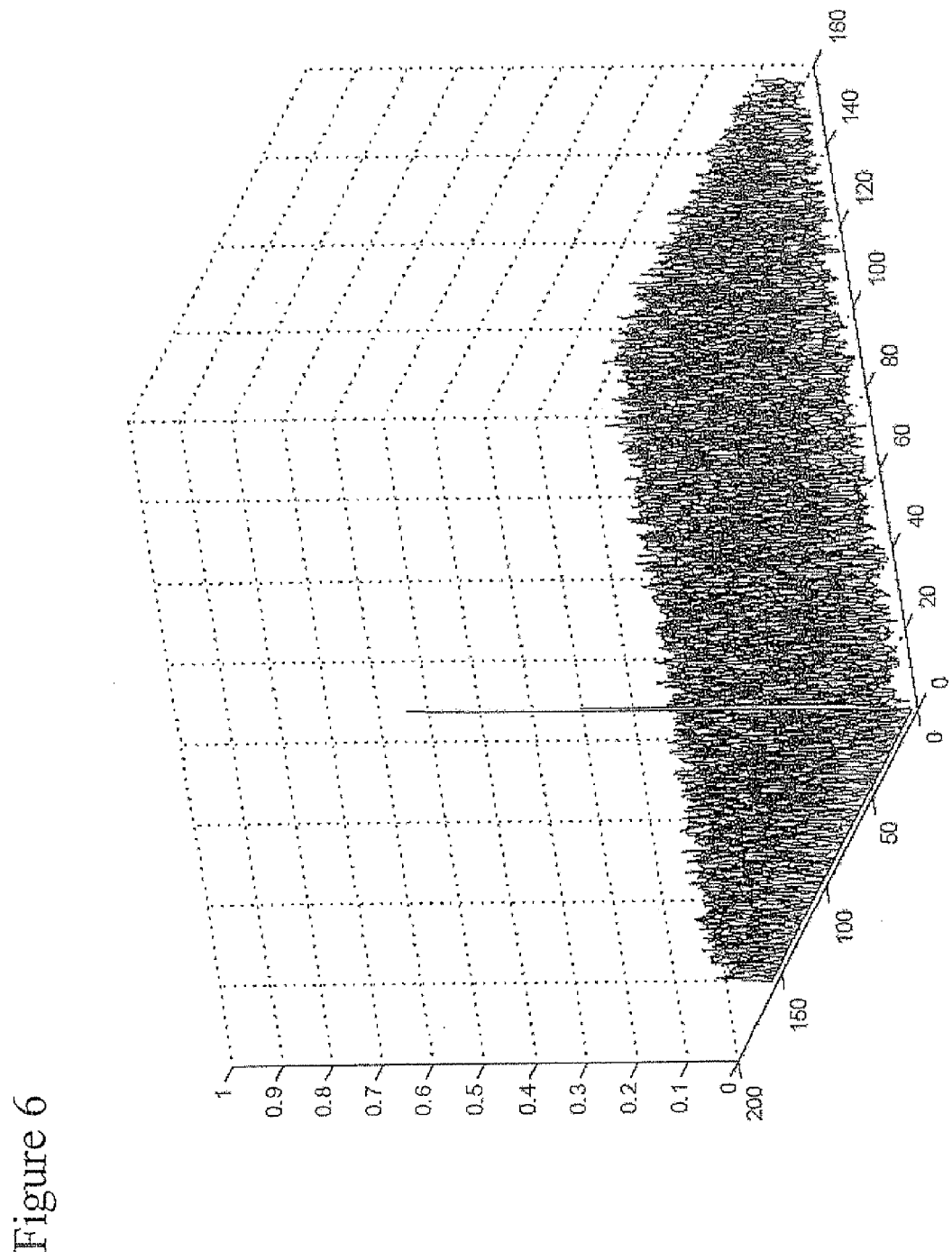
FIG. 6 is a graph of an ambiguity function for a Weil dictionary.

The ambiguity function of the Weil dictionary is show in FIG. 6. It is seen that interference of all other atoms is consistently small. This allows better reception in the presence of a large number of transmitters. Furthermore, the Weil dictionary contains more differentiable atoms for a given signal length q than a pseudo random dictionary.

Figure 7:
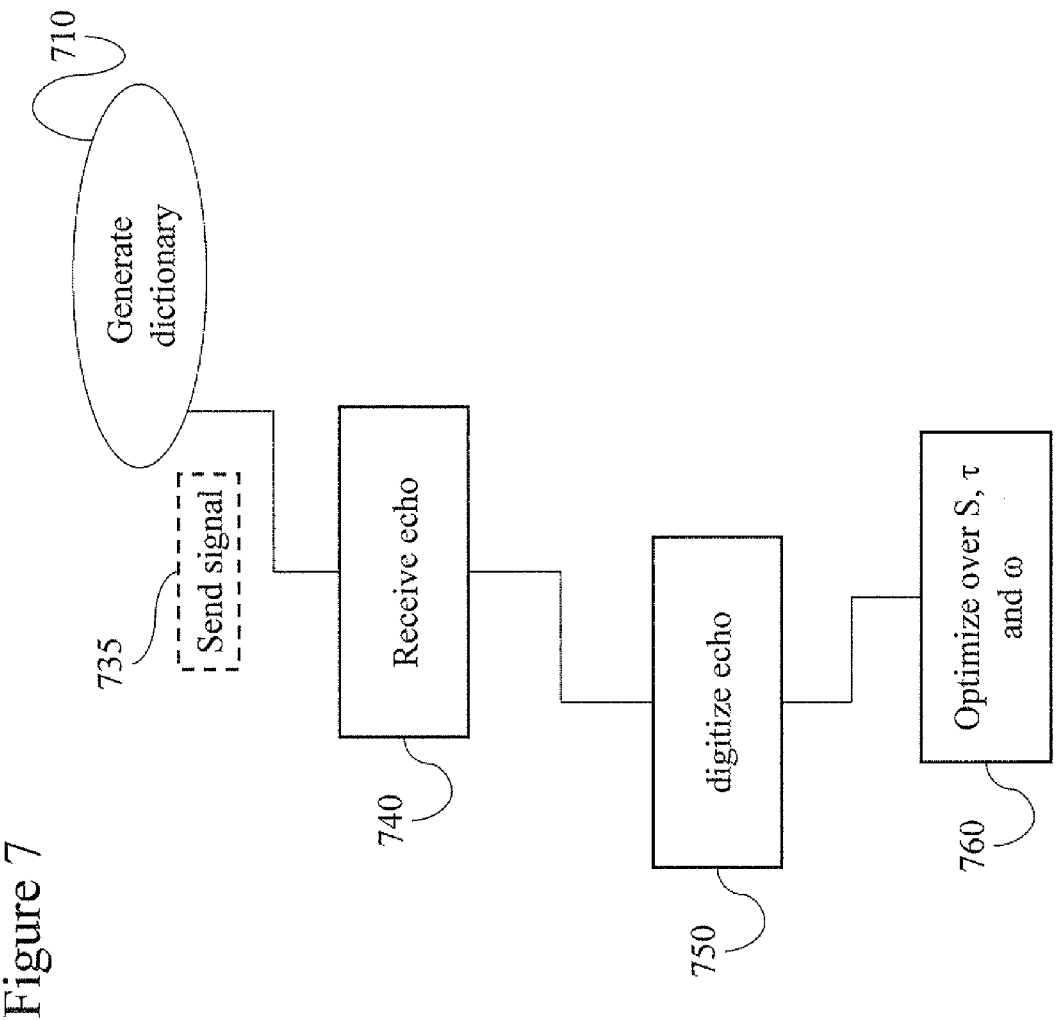
FIG. 7 is as a flowchart of a method of interpreting radar using a Weil dictionary.

Attention is called to FIG. 7, which is a flow chart illustrating an embodiment of a method of interpreting a radar signal. First there must be provided 710 a group of signals that can be detected and differentiated and optimized unambiguously in the time/frequency domain. A few of different signals are sent 735 out at different times and conditions of broadcast (or different directions). The echo of the compound signal is received 740 and digitized 750. Because there may be more than one object at various differences it is understood that the returning echo will be very complex with multiple peaks in the time/frequency plane as signals reflected from one object will return faster than signals reflected from another object. Therefore, it is necessary to detect the same signal with more than one phase and time shift. Thus the ideal ambiguity function is the thumbtack pattern of FIG. 6 supplied by the Weil dictionary with weak cross and auto correlation allowing independent discrimination of signal form, phase shift and time shift. To find the correct peaks is exactly the same optimization 760 as described above for CDMA. From the time shift of each peak the operator knows the relative speed of the object and from the frequency modulation the operator knows the distance to the object and by changing wave form (i.e. using different atoms) as the signal sweeps over time and angle, the operator can determine the direction to the object and changes in its relative location and velocity.

Figure 8:
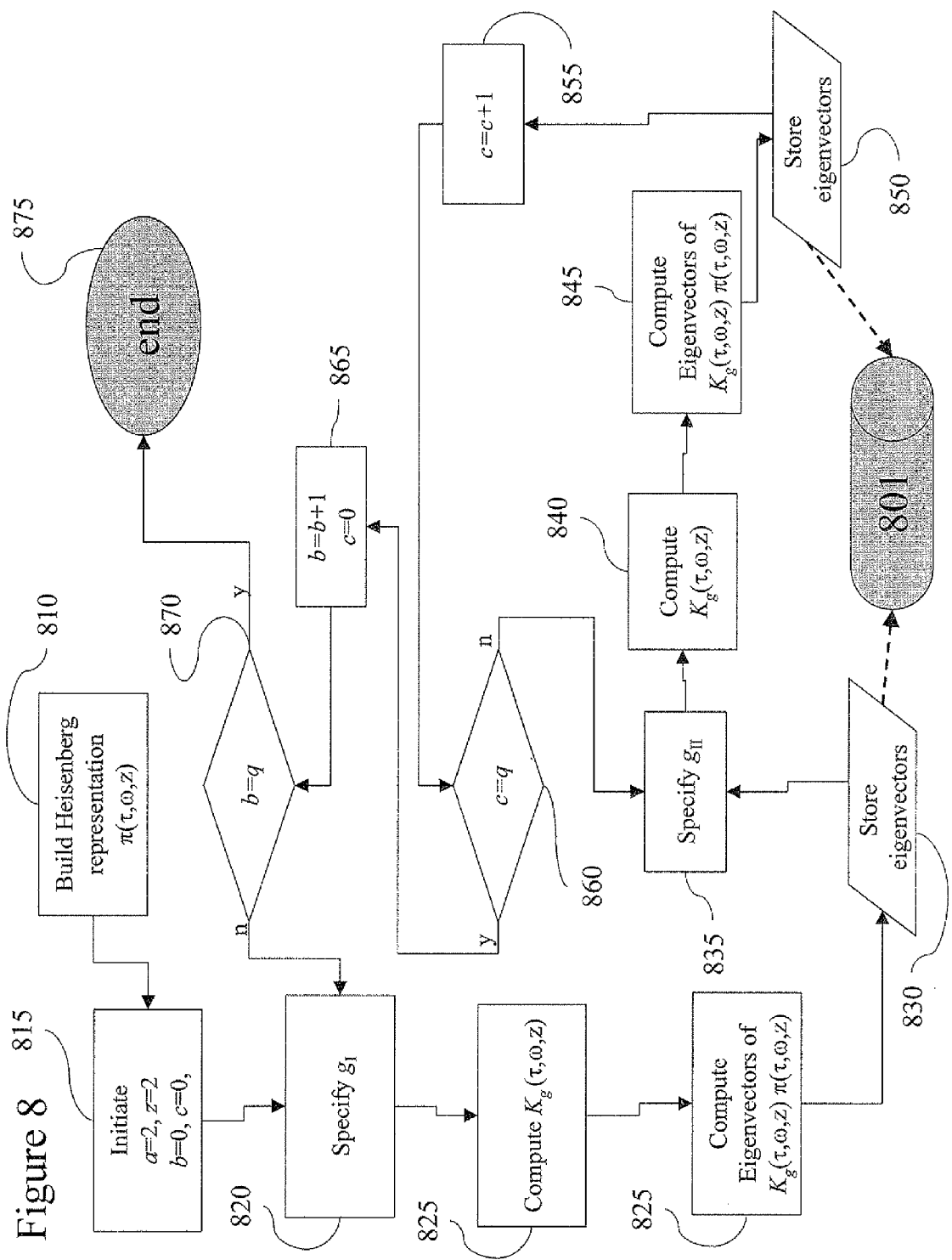
FIG. 8 is a flowchart of an embodiment of a method of producing a Weil dictionary.

Attention is called to FIG. 8, which is a flow chart illustrating a method of generating a set of atoms spanning a signal space using Weil representation. The existence of a Weil representation of a Hilbert space is known and was first described by Weil [Weil A., Sur certains groupes d'operateurs unitaires. Acta Math. 111 (1964) 143-211] and is known to those skilled in the art of theoretical mathematics. Nevertheless, the Abelian subgroups of the Weil representation described herein have never previously been publicly enumerated. Furthermore, the properties of the eigenvectors of the Abelian subgroups of the Weil representation have never been described and no on-e has ever suggested practical application of this theoretical construct. Unlike the Heisenberg system described above, the Weil representation has no continuous form and has never been applied in any way or form to radar, communication or sparsity.

The Weil representation allows representation of any finite Hilbert space $H(F_q^n)$ in terms of any appropriate symplectic group $Sp(2n, F_q)$. In the following example for simplicity we illustrate the producing a Weil dictionary for a the one dimensional case (n=1) the Weil representation is a map from $SL(2, F_q)$ to the Hilbert space $H(F_q)$. Representation of a higher dimensional Hilbert space may be by linearization and or by using a higher order symplectic representation. The treatment of higher dimensional Hilbert spaces is therefore analogous to the treatment of a linear space described below and will be understood by those skilled from the description herein.

The first step of the method is to generate 810 a Heisenberg group. The group is a set of elements $(\tau, \omega, z) \in F_q \times F_q \times F_q$ with the multiplication rule $(\tau_1, \omega_1, z_1)(\tau_2, \omega_2, z_2) = (\tau_1 + \tau_2, \omega_1 + \omega_2, z_1 + z_2 + (\tau_1 \omega_2 - \tau_2 \omega_1)/2)$.

The representation is given in terms of the time and frequency shift operators on the finite signal Hilbert space. The time shift operator action is $L(\tau)S(t) = S(t+\tau)t$; $\tau \in F_q$, the frequency shift operator action is $M(\omega)S(t) = \exp(2\pi i \omega t/q)S(t)$ $t; \omega \in F_q$.

The Heisenberg representation is denoted by $\pi$ if and given by $\pi(\tau, \omega, z) = \exp((\pi i \omega \tau + 2z)/q)M(\omega)L(\tau)$ and should be understood also as a q×q matrix.

The Heisenberg representation is irreducible and these operators span the algebra of all linear operators on that finite dimensional Hilbert space. This means that for any operator $A \in U(H(F_q))$ we can write $$A = \sum_{\tau,\omega,z} f_A(\tau, \omega, z)\pi(\tau, \omega, z)$$

with the function $f_A(\tau, \omega, z)$ over the Heisenberg group which depends on the operator A. We use this property to build the Weil representation and then the Weil dictionary.

The Weil representation a homomorphism of the group of 2×2 matrices whose elements belong to the finite field $F_q$ symbolized as $SL(2,F_q)$ into the unitary operator on the Hilbert space $U(H(F_q))$. Thus for 2×2 matrix $g \in SL(2,F_q)$ the Weil representation is denoted by $\rho(g) \in U(H(F_q))$. As stated above, since the operators of the Heisenberg representation span the Hilbert space, we can write the Weil representation as $$\rho(g) = \sum_{\tau,\omega,z} K_g(\tau, \omega, z)\pi(\tau, \omega, z).$$

To enumerate the Weil representation we need a set of matrices g spanning $SL(2,F_q)$. We will generate this set in two parts a set of q/2 matrices that we label $g_I(b)$ and a set of $q^2/2$ matrices that we label $g_{II}(b,c)$ where $b,c \in F_q$.

First we initiate 815 a set of indices. The indices a and z are arbitrary and in the example of FIG. 8 they are initiated to the value 2. The indices b and c will denote various sub-groups and are initiated to zero. Given a group, which as stated previously is a set of objects with a multiplication rule under which the set is closed, contains a neutral element and an inverse for any element in the set. A subgroup is a subset of the original set with the same multiplication rule that forms a group i.e. is closed, contains a neutral element and an inverse for any element in the subset.

As stated previously, we build dictionary by finding a common set of eigenvectors of a collection of commutative subgroups a.k.a. Abelian subgroups of the symplectic group. For the case of one dimensional signals, the symplectic space is SL(2,$F_q$). Various embodiments (collections) are possible. We describe here one such collections, other embodiments (collections) are possible based on the methodology outlined herein and are included.

The set of all diagonal matrices T in SL(2,$F_q$) with the usual matrix multiplication is a commutative subgroup. We denote this subgroup by $$T = \left\{ \begin{pmatrix} a & 0 \\ 0 & -a \end{pmatrix} \middle| a \in F_q \right\}$$

Using the Weil representation each 2 by 2 matrix in this subgroup T is assigned to a corresponding q by q unitary matrix. The representation preserves the group structure and therefore all these q by q matrices commute. As a consequence they share the same eigenvectors. These eigenvectors span the Hilbert space. The algorithm takes an element of g∈T that generates the group T by powers, i.e. {T=$g^n$|n=0, . . . , q−2}, and find the eigenvectors of ρ(T)={ρ(g)|g an element in T} (since the eigenvectors are shared it is enough to find the eigenvectors of one member of T Standard procedures for finding eigenvectors are available for example in the signals and linear algebra toolboxes of MATLAB® and many other commercially available mathematical packages). There are q eigenvectors of the q by q matrix. Thus, the subgroup T contributes q vectors to the dictionary.

To create a large number of Abelian subgroups we now multiply a matrix T in front and behind by an arbitrary 2 by 2 matrix and its inverse. Clearly $$g^{-1}Tg = \left\{ g^{-1}\begin{pmatrix} a & 0 \\ 0 & -a \end{pmatrix} g \middle| a \in F_q \right\}$$

is an Abelian subgroup for any g∈SL(2,$F_q$). We consider the collection of all Abelian subgroups of this type. The collection of eigenvectors from each subgroup is the proposed dictionary. Note that there is a large redundancy in this description since different group elements g may produce the same subgroup.

In order to find all such subgroups with less redundancies we parameterize the SL(2) group by the Bruhat decomposition. This decomposition asserts that any element g∈SL(2,$F_q$) can be written either as $$g_I = \begin{pmatrix} a & 0 \\ 0 & -a \end{pmatrix}\begin{pmatrix} 1 & b \\ 0 & 1 \end{pmatrix}$$

with a,b⊖$F_q$ or as $$g_{II} = \begin{pmatrix} a & 0 \\ 0 & -a \end{pmatrix}\begin{pmatrix} 1 & b \\ 0 & 1 \end{pmatrix}\begin{pmatrix} 0 & 1 \\ -1 & 0 \end{pmatrix}\begin{pmatrix} 1 & c \\ 0 & 1 \end{pmatrix}$$

with a,b,c∈$F_q$.

Thus after initializing 815 a first part of the Bruhat decomposition $g_I$ is specified.

Clearly the subgroup is not sensitive to the value of a and thus fixing a=2 and running over all b,c∈$F_q$ provides all subgroups. The number of such subgroups is q(q+1)/2. For each subgroup there are q eigenvectors each of which is an atom in the dictionary giving a total of $q^2$(q+1)/2 atoms.

Once a 2 by 2 matrix $g_I$ representation has been specified 820 it is necessary to compute 825 the coefficients $K_g$(τ, ω, z) for a member of the subgroup represented by $g_I$ this is done as follows.

$$K_g(v, z) = \frac{1}{q}\sigma(-\det(\kappa_g + I))\psi\left(\frac{1}{4}\Omega(\bar{\kappa}_g v, v) - z\right)$$

where ψ(x)=exp(2πi x/q), v is a column vector such that $v^t$=(τ, ω), σ is the Legendre character [σ(a)=1 if a=$y^2$ for some y∈$F_q$ and σ(a)=−1 if a≠$y^2$ for any y∈$F_q$], $\kappa_g$=(g+I)(g−I)$^{-1}$ is a 2 by 2 matrix that acts on two-dimensional vectors where I is the 2 by 2 identity matrix and $$\Omega(v_1, v_2) = v_1^t \begin{pmatrix} 0 & 1 \\ -1 & 0 \end{pmatrix} v_2$$

The eigenvectors of the q by q matrix Σ$K_g$(τ, ω, z)π(τ, ω, z) are then computed (standard software is available for computing the eigenvectors of a matrix [e.g. MATLAB® signals and linear algebra packages]. Such software is well known in the art and allows simple computation of these vectors once the matrix Σ$K_g$(τ, ω, z)π(τ, ω, z) is known). The q eigenvectors for the subgroup represented by $g_I$(b=0) are then stored 830 on a storage device 801.

Once the eigenvectors associated with $g_I$(b=0) have been stored 830, a second subset for b=0 is specified 835 $g_{II}$(b=0, c=0). A new set of coefficients $K_g$ are then computed 840 (by the same formula as above but using the new 2 by 2 matrix $g_{II}$) for $g_{II}$ and the eigenvectors of the resulting q by q matrix Σ$K_g$(τ, ω, z)π(τ, ω, z) for $g_{II}$(b=0,c=0) are computed 845 and stored 850 in a memory 801.

Once the eigenvectors associated with $g_{II}$(b=0,c=0) have been stored 850, the index c is incremented 855, and if 860 the index c<q then a new 2 by 2 matrix $g_{II}$(b=0,c=1) representing a new subgroup is specified 835 and if 860 c<q then a new set of coefficient $K_g$ are then computed 840 for $g_{II}$ and the eigenvectors of the resulting q by q matrix $K_g$(τ, ω, z)π(τ, ω, z) for $g_{II}$(b=0,c=1) are computed 845 and stored 850 in a memory 801.

Thus the algorithm continues incrementing C until c=q. Thus for b=0 there was one subset associated with $g_I$ plus q subsets associated with gal for a total of q+1 subsets associated with b=0. If 860 c=q then all the atoms for b=0 have been found. Therefore b is incremented and c is reinitialized to zero 865 and a new matrix $g_I$ is specified 820 and the loop continues for q values of b until b=q 870 at which point the loop ends 875 so that in the end there are q(q+1) subgroups each having q eigenvectors giving a total of $q^2$(q+1) eigenvectors.

A dictionary of atoms Do which are the eigenvectors constructed by taking the eigenvectors of a representation of a finite symplectic group (a Weil representation) (for example in the example of FIG. 8) is called the oscillator system. These signals constitute, in an appropriate formal sense, a finite analogue for the eigenfunctions of the harmonic oscillator in the real setting and, in accordance, they share many of the nice properties of the latter class. In particular, the dictionary Do satisfies the following properties 1) weak autocorrelation (ambiguity function) under time translation and frequency modulation. For every $S_i 2 D_O$ we have The autocorrelation $jhS_i; M_\omega L_\tau S_i ij$ is equal to 1 if both $(\tau,\omega)=0$ and the autocorrelation is less then $2q^{-1/2}$ if either $\tau$ or $\omega$ is not 0.

2) weak cross-correlation (cross-ambiguity function) for all atoms and also under time translation and frequency modulation. For every $$S_1 \neq S_2 2 D_O \text{ we have}$$

the cross correlation $jhS_1; M_w L_\tau S_2 ij$ is less then or equal to $4_q^{-1/2}$ for every $\tau$ and $\omega 2F_p$.

3) Small supremum. For every atom $S 2 D_O$ we have $$\max\{|S(t)|: t \epsilon F_q\} \leq 2q^{-1/2}$$

4) Fourier invariance. For every atom $S 2 D_O$ the Fourier transform of S is also in $D_O$ The oscillator dictionary $D_0$ can be extended to a much larger dictionary $D_E$, consisting of the order of $q^5$ atoms if one is willing to compromise Properties 1 and 2 for a weaker condition. The extended dictionary consists of all atoms of the form $M_w L_\tau S$ for $\tau$ and $\omega \epsilon F_p$ and $S \epsilon D_O$. It is not hard to show that the number of atoms in $D_E$ is $q^2$ times the number of atoms in $D_O$. As a consequence of properties 1 and 2, for every $S_1 \neq S_2 2 D_E$ we have the cross correlation $jhS_1; S_2 ij$ is less then or equal to $4q^{-1/2}$.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

In sum, although various embodiments and preferred versions thereof have been described in considerable detail, other versions are possible. Therefore, the spirit and scope of the appended claims should not be limited to the description of the preferred versions contained herein.

What is claimed is:

1. A method for encoding and decoding messages of a transmitter-receiver system, the method comprising:
    (a) defining a representation of a commutative subgroup of a finite symplectic group;
    (b) specifying a plurality of atoms wherein each of said plurality of atoms is an eigenvector of said representation;
    (c) producing a dictionary comprising said plurality of atoms;
    (d) storing said dictionary in the system storage medium;
    (e) defining for each user a different atom for encoding transmitted messages; and
    (f) decoding received messages using said stored dictionary,
    wherein said symplectic group is a 2n-dimensional matrix group of symplectic matrices $Sp(2n, F_q)$, and wherein Fq is a finite field with q elements.

2. A method for encoding and decoding messages of a transmitter-receiver system, the method comprising:
    (a) defining a representation of a commutative subgroup of a finite symplectic group;
    (b) specifying a plurality of atoms wherein each of said plurality of atoms is an eigenvector of said representation;
    (c) producing a dictionary comprising said plurality of atoms;
    (d) storing said dictionary in the system storage medium;
    (e) defining for each user a different atom for encoding transmitted messages; and
    (f) decoding received messages using said stored dictionary,
    wherein the set of verifiable properties of said plurality of atoms includes at least one property selected from the group consisting of a normalized peak-to-average power ratio of less the inverse of the square root of q, an autocorrelation under frequency modulation and time translation of less than $2q^{-1/2}(q+1)/(q-1)$, and a cross correlation of less than $4(q+1)(q-1)^{-1}q^{-1/2}$.

3. The method of claim 1, further comprising
    extracting a sparse representation of at least one of said signals in terms of at least one of said plurality of atoms.

4. The method of claim 1, wherein said representing is via a Weil representation of operators.

5. The method of claim 1, wherein said dictionary is applied to at least one task selected from the group consisting of interpreting a radar signal, denoising at least one of the signals, compressing data, deblurring at least one of the signals, finding a sparse representation of at least one of the signals, encoding a symbol for communication, encoding at least one symbol for CDMA or OFDM communication, classifying a data set and generating an error correcting code.

6. The method of claim 2, wherein said at least one property is invariant under at least one operation selected from the group consisting of a Fourier transform, a quadratic modulation and a homothety.

* * * * *